J. L. BUTLER.
CHUCK.
APPLICATION FILED OCT. 3, 1917.

1,285,928.

Patented Nov. 26, 1918.
2 SHEETS—SHEET 1.

INVENTOR.
James L. Butler
BY
Robert M. Pierson
ATTORNEY

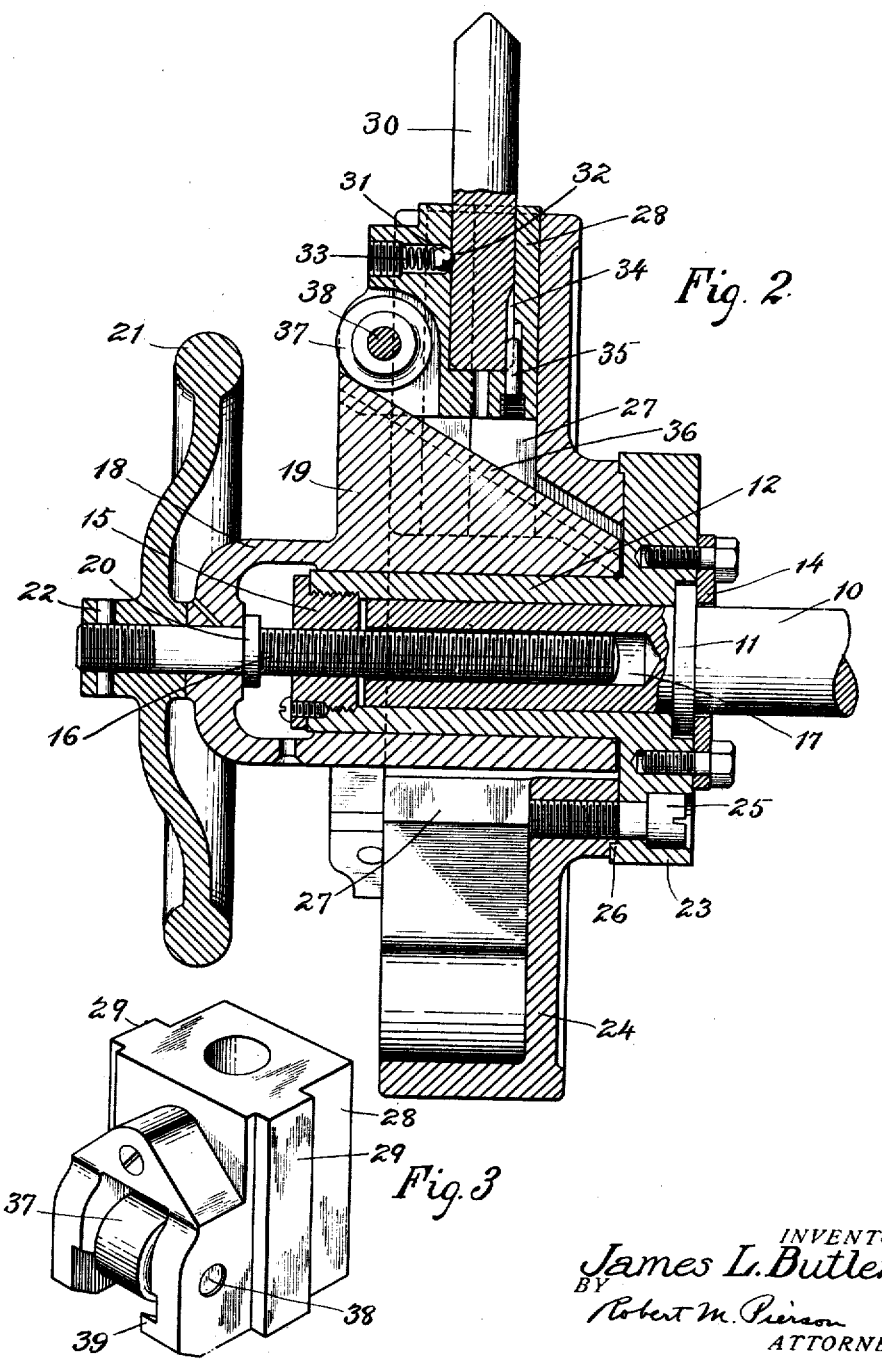

UNITED STATES PATENT OFFICE.

JAMES L. BUTLER, OF AKRON, OHIO, ASSIGNOR TO THE B. F. GOODRICH COMPANY, OF NEW YORK, N. Y., A CORPORATION OF NEW YORK.

CHUCK.

1,285,928.  Specification of Letters Patent.  Patented Nov. 26, 1918.

Application filed October 3, 1917. Serial No. 194,481.

*To all whom it may concern:*

Be it known that I, JAMES L. BUTLER, a citizen of the United States, residing at Akron, in the county of Summit and State of Ohio, have invented certain new and useful Improvements in Chucks, of which the following is a specification.

This invention relates to chucks, and especially those which expand to grip a tire-making core or other annular article by its inner periphery. The object of my invention is to provide a chuck which will securely and rigidly hold the work and be capable of quick and easy adjustment to engage and release the latter and accommodate itself to different sizes. I further aim to provide such ample support for the radially-movable jaw-blocks as will afford the maximum of strength, durability and ease of operation combined with a reasonable cost of manufacture and a compact arrangement of parts.

Of the accompanying drawings.

Fig. 2 is a longitudinal vertical section on the line 2—2 of Fig. 1.

Fig. 3 is a perspective view of one of the jaw-blocks.

Figure 1:
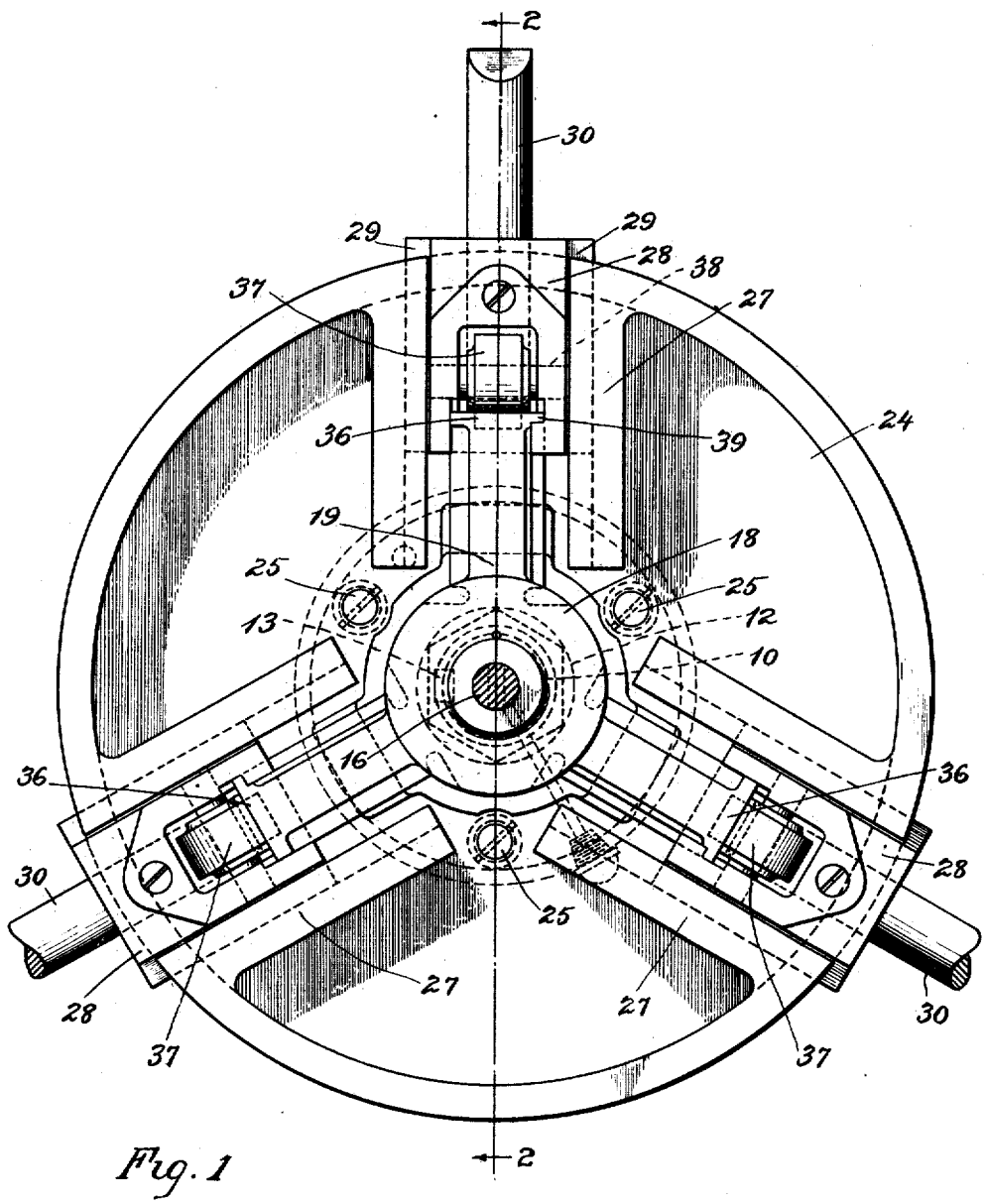
Figure 1 is a front elevation showing a preferred embodiment of my improved chuck, omitting the hand-wheel.

In the drawings, 10 is a shaft formed with a flange 11, and 12 is a sleeve secured to said shaft by a key 13 shown in broken lines in Fig. 1, and provided at its rear end with a recess to receive the flange 11 and a bolted retaining ring 14 engaging said flange. Thus the sleeve is rigidly secured to and is functionally a part of the shaft, though formed separately for convenience of manufacture and assembly. In the forward end of the sleeve 12 is screwed a nut 15 which also is made separately for convenience and renewability, its thread constituting an internal thread on the shaft, engaging the thread on an adjusting screw 16 whose inner end is received in a longitudinal bore or cavity 17 in the shaft 10.

18 is the cup-shaped hub of a multiple wedge member 19 whose end wall is held as to endwise movement with relation to the screw 16 by a flange 20 on said screw and the hub of a hand-wheel 21 which is pinned at 22 to the outer end of the screw and adapted to rotate the latter.

On the rear end of sleeve 12 is formed a flange 23 to the front face of which a circular jaw-holding plate 24 is secured by screws 25, the plate being centered on the flange by a shallow telescopic connection 26.

Plate 24 is formed on its front side with three equidistant radial guide-ways 27 in which are mounted radially-slidable jaw-blocks 28, each of the latter having a tongue-and-groove undercut connection 29 with its guideway 27 on both sides to hold the block against forward movement axially of the plate, and having a bearing against said plate over the entire rear surface of the block. Each block 28 is radially socketed to receive the inner end of a pin 30 whose outer end has a suitable form, such as the V-shape here shown, to engage the inner perimeter of the tire-forming core or other work, and its inner end is retained in the block 28 by a ball-catch 31 entering a recess 32 in the pin and backed by a spring 33, this form of catch being automatically engaged and released by the manual insertion or retraction of the pin, thus enabling the pins to be readily exchanged for others of different lengths suited to different diameters of work. A longitudinal groove 34 at the base of the pin and a feather 35 in the block prevent the pin from turning in its socket.

On the hub 18 of the multiple wedge member 19 are formed three wedges 36 inclined forwardly and outwardly and working at the inner ends of the guideways 27 between the sides of the latter. The radial thrust of the wedges is communicated to the blocks 28 by means of anti-friction wheels or rollers 37 journaled on pins 38 on said blocks, and each block has a tongue-and-groove connection at 39 with one edge of the corresponding wedge 36, which causes the blocks to be retracted by a forward movement of the wedges. It will be noted that the cylindrical portion of the hub of wedge member 18 telescopes upon the outer surface of sleeve 12 and is amply supported thereby in any axial position of the multiple wedge member relatively to the sleeve, but does not turn on said sleeve.

To project or retract the work-supporting jaw-blocks 28 and their pins 30, the screw 16 is turned in the relatively-stationary nut 15 by means of hand-wheel 21, and this causes the screw to move axially in or out with reference to the shaft 10, carrying with it the member 19 with the three wedges 36. If screw 16 has a left-hand thread as shown, a clockwise movement of the hand-wheel will draw the screw and wedges forward and move the blocks 28 radially inward, while a contrary movement of the hand-wheel moves the blocks outwardly against the work. As it is easy to spin the wheel 21, a movement of considerable amplitude may be quickly imparted to the blocks 28 without using a steep-pitched screw-thread, and at the same time the final outward movement of the chuck jaws against the work is performed with great power and the jaws are securly locked in their operative position by reason of the screw and nut 15, 16 combined with the wedges 36.

The arrangement of parts enables the chuck to be very strongly constructed in a relatively small compass, and the ample bearing surfaces contribute both to ease of operation and great durability.

I claim:

1. In a chuck, the combination of a series of jaws movable radially in a fixed plane, wedges under said jaws movable axially to operate the latter, a stationary nut, and a rotary screw in said nut connected with the wedges and movable axially therewith to operate said wedges.

2. In a chuck, the combination of a hollow shaft having a nut, a screw working through said nut into and out of the hollow shaft, a multiple wedge member non-rotatively mounted on said shaft and movable axially thereof by means of the screw and nut, said member having a series of wedges, a plate fastened to said shaft and having a series of radial guideways, and chuck-jaws mounted in said guideways and operated by the wedges.

3. In a chuck, the combination of a hollow shaft provided with an internal screw-thread, a multiple wedge member telescoping externally on said shaft, a screw adapted to turn in the hub of said wedge member and held from axial movement with respect thereto, said screw engaging the thread on the shaft, a hand-wheel for rotating the screw, a series of wedges on said wedge member and a series of radially-movable chuck jaws operated by the wedges.

4. In a chuck, the combination of a central supporting shaft having a thread and adapted to be mounted stationarily as to axial movement, a plate on said shaft having a series of radial guideways, jaw-blocks mounted in the several guideways and each having a tongue-and-groove connection with its guideway at the sides and a sliding bearing against the plate at the back of the block, an anti-friction roller mounted on the front of each block, a multiple wedge member telescoping on said shaft and having a series of wedges engaging the respective rollers on the jaw-blocks, and a screw engaging the thread on said shaft for moving the wedge member axially thereof.

5. In a chuck, the combination of a supporting plate having a radial guideway, a jaw-block mounted in said guideway and having a pin socket, a work-engaging pin mounted in said socket, and a pin-retaining catch on the jaw-block automatically engaged and disengaged by the insertion and retraction of the pin.

In testimony whereof I have hereunto set my hand this 27 day of September, 1917.

JAMES L. BUTLER.